(No Model.)

J. R. CRIBBS.
CAR BRAKE.

No. 507,311.  Patented Oct. 24, 1893.

Witnesses:
Lucilla Stevenson
O. W. Stevenson

Inventor.
John R. Cribbs
By J. H. Stevenson
Atty.

UNITED STATES PATENT OFFICE.

JOHN R. CRIBBS, OF VERONA, PENNSYLVANIA.

CAR-BRAKE.

SPECIFICATION forming part of Letters Patent No. 507,311, dated October 24, 1893.

Application filed July 29, 1893. Serial No. 481,902. (No model.)

*To all whom it may concern:*

Be it known that I, JOHN R. CRIBBS, a citizen of the United States, residing at Verona, in the county of Allegheny and State of Pennsylvania, have invented certain new and useful Improvements in Car-Brakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is a brake for railway cars, the nature and operation of which is particularly set forth hereinafter.

Figure 1:
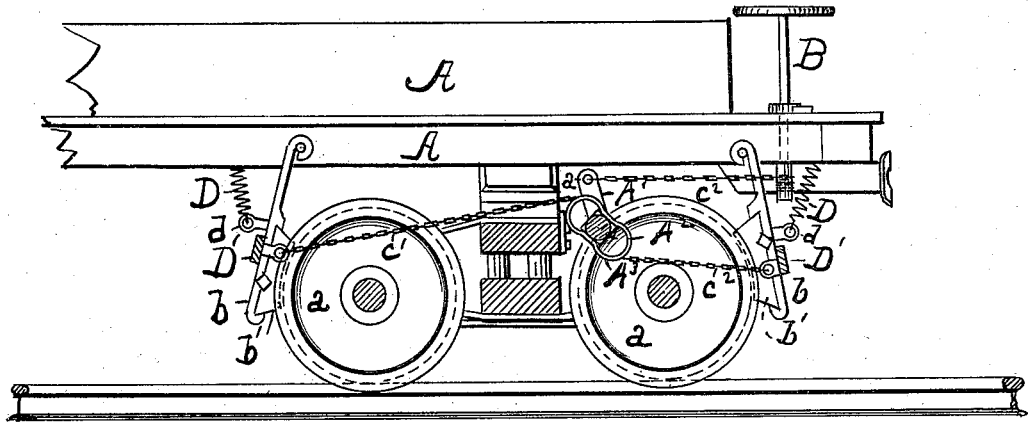
Figure 2:
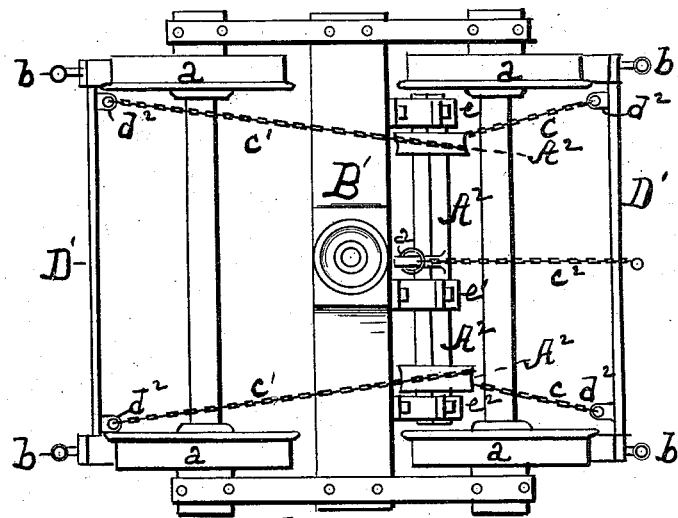
Figure 3:
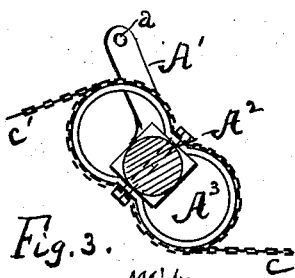
Figure 4:
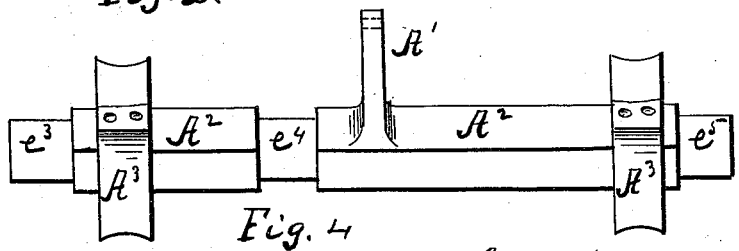

In the accompanying drawings, Figure 1 is a side elevation of a car showing my brake system. Fig. 2 is a top view of a car with my brake system or device. Fig. 3 is a detail view of the lever and chain attachment and Fig. 4 is a full length view of the shaft to which the lever chains are attached from the brake bars.

A A represents the body of a car.

A' is a lever on the shaft $A^2$.

$A^3$ $A^3$ are pulleys made in the form of levers, and may be of divers shapes and to these pulleys the brake chains are fixed, one at the bottom and one over the top so that both brakes can be operated at one operation of the brake staff B, more fully explained hereinafter.

$a'$ $a'$ are car wheels.

$a$ is the point of the lever A' where the brake chain is attached.

D is a spring.

D' D' are brake bars on the hangers $b\ b$.

$b'\ b'$ are brake shoes.

$c\ c$ are brake chains at the forward end and $c'\ c'$ are the brake chains at the other end of the car. The chains $c\ c$ are secured to the brake beam at the points $d^2\ d^2$ at both ends of the car.

B' is a cross beam beneath the car to which the shaft $A^2$ is secured by any suitable means or boxing, as $e, e'\ e^2$ and $e^3, e^4$ and $e^5$ are bearings for the same purpose on the shaft $A^2$. The springs D are secured to the under side of the car at one end and to the hangers $b\ b$ at $d\ d$. The function of these springs is to draw back on the hangers so as to keep the shoes $b'\ b'$ from touching the wheels when the brake is released.

It will be noticed that I place the brake beams higher up than usual. This I deem an essential feature of my car brake as by placing these beams on a level with or above the line of the car axles provision is thereby made for keeping these beams above many obstructions, snow, &c., on the track, permitting the car to pass over many things that would be struck by the beams when placed low down.

I do not claim anything novel in the shoes, hangers or even the springs but I do consider my arrangement of the other parts, of the brake device as new and useful.

In operation it will readily be seen that on turning the brake-staff B, a draft is at once made on the lever A', drawing it forward. This movement carries the top part of the pulleys forward also thus drawing on the rear brake beam and at the same time the chains $c\ c$ at the front being attached at the bottom of the pulleys $A^3$ are drawn the other way thus drawing on the front brake beam so that a draft on the chain $c^2$ will draw the brake shoes fore and aft at the same time. As the draft chains $c$ and $c'$ are fixed to the brake beams near the ends thereof it will be seen that a much smaller beam can be used than in case of drawing on the same from the center, as is generally done.

Iron or steel rods may be used instead of the brake chains and I prefer to use them with my invention.

Having thus described my invention, what I claim, and desire to secure by Letters Patent of the United States, is—

In a brake for rail way-cars the shaft $A^2$ having the bearings $e^3, e^4\ e^5$, pulleys $A^3$, lever A', the beam B', chains $c\ c, c'\ c'$ and $c^2$ beams D' D', hangers $b\ b$ and springs D and brake lever B all in combination substantially as described and shown.

In testimony whereof I affix my signature in presence of two witnesses.

JOHN R. CRIBBS.

Witnesses:
JOHN K. BARBOUR,
MICHAEL STEEPLETON.